Feb. 21, 1933.     R. O. NEWELL     1,898,847
CORN PLANTER
Filed March 20, 1930     4 Sheets-Sheet 2

INVENTOR.
Ralph O. Newell
BY
ATTORNEYS.

Feb. 21, 1933. R. O. NEWELL 1,898,847
CORN PLANTER
Filed March 20, 1930 4 Sheets-Sheet 3
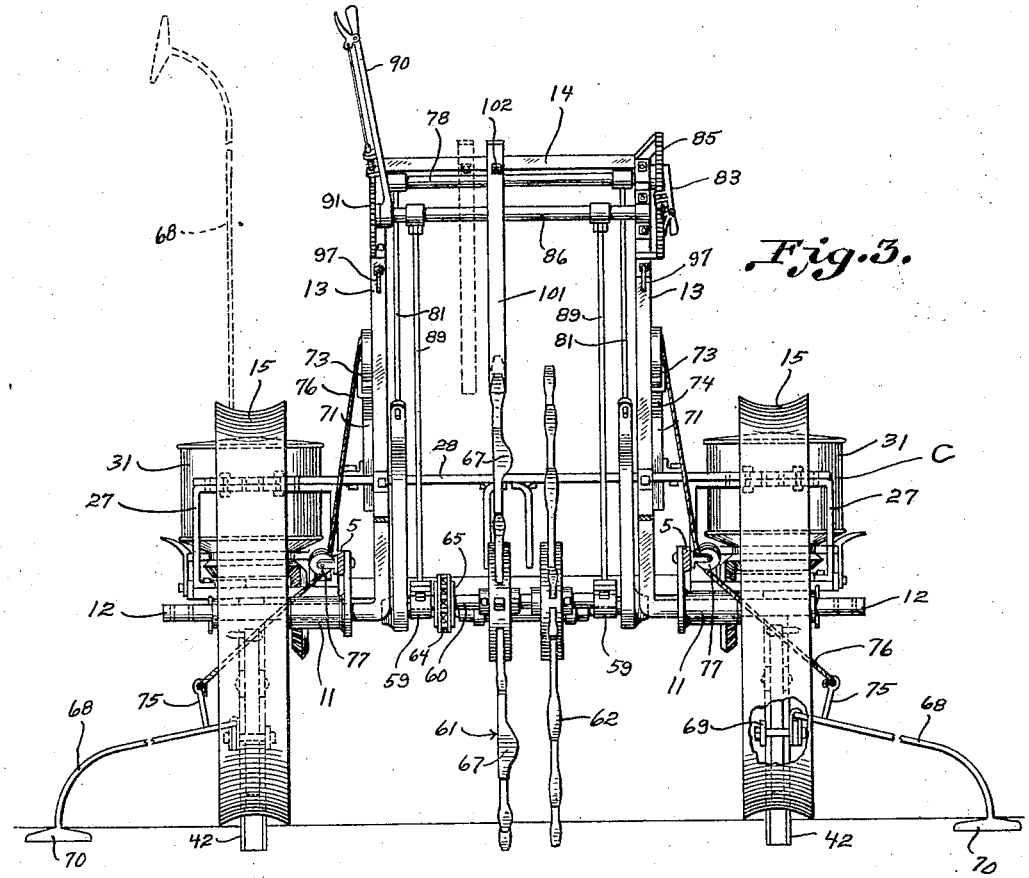
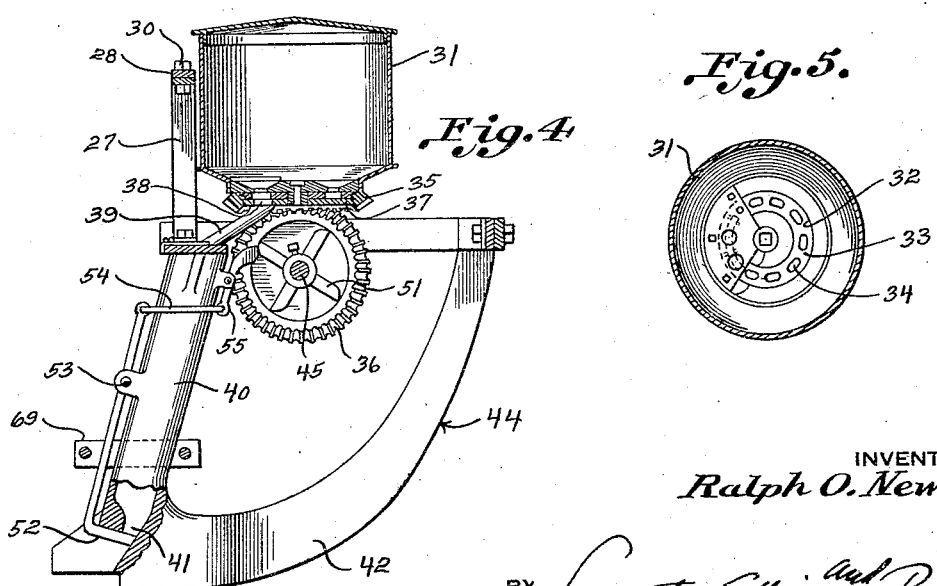
INVENTOR.
Ralph O. Newell
BY Lancaster Allwine and Rommel
ATTORNEYS.

Feb. 21, 1933.   R. O. NEWELL   1,898,847
CORN PLANTER
Filed March 20, 1930   4 Sheets-Sheet 4
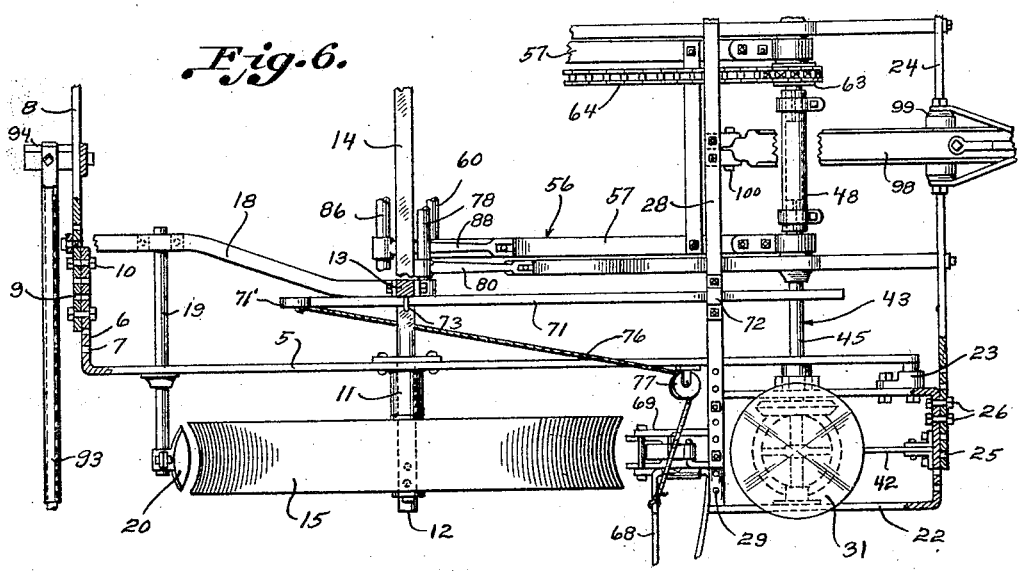
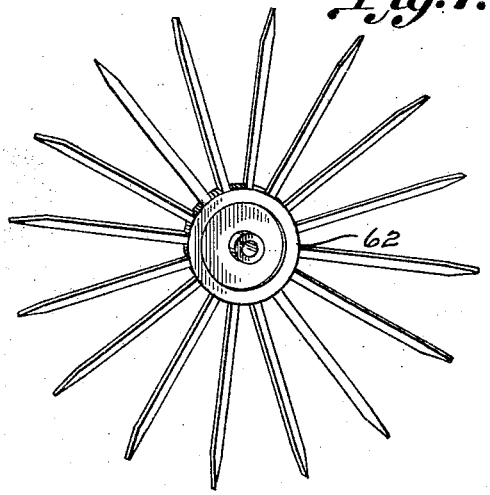
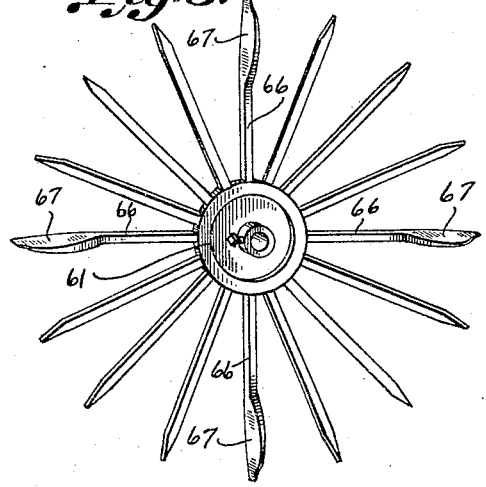
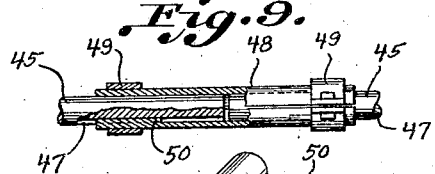
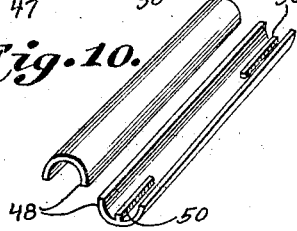
INVENTOR.
Ralph O. Newell
BY Lancaster Allwine and Rommel
ATTORNEYS.

Patented Feb. 21, 1933

1,898,847

UNITED STATES PATENT OFFICE

RALPH ORLIN NEWELL, OF BRUNSWICK, NEBRASKA

CORN PLANTER

Application filed March 20, 1930. Serial No. 437,442.

The present invention relates to corn planters of the type shown in Patent #731,604 granted to me in June 23, 1903.

The primary object of the invention is to provide an improved corn planter whereby the corn may be checked so that the distance between the hills along the rows will be the same as the distance between the rows without requiring the use of check wires.

A further object of the invention is to provide a planter of this type embodying novel checking means whereby the seed outlet of the seed dropping mechanism will be properly spaced and aligned with the planted rows when starting a new row so as to align the hills transversely of the rows.

A further object of the invention is to provide a corn planter of the double row type embodying an adjustable frame permitting the planter to be adjusted for planting rows different distances apart.

A further object of the invention resides in the arrangement whereby the seed dropping devices are operated from a common drop shaft of a construction permitting adjustment of the devices toward and away from one another in proper alignment with the covering wheels of the planter.

A still further object resides in the novel arrangement whereby the combined driving and checking means may be raised out of engagement with the ground for rendering the seed dropping mechanism inoperative and thereby dispensing with clutches for engaging and disengaging the drive connections to the seed dropping mechanism.

In my issued patent referred to, a single driving spur wheel is provided having but nine spurs, three of which are formed with paddle-like portions providing marking spurs. With this small number of spokes or spurs, slipping of the spur wheel occurred which resulted in improper aligning of the markings with the planted hills. To overcome this fault I have devised a new arrangement of marking and drive means which will eliminate this slipping and insure proper cross row alignment of the ground markings with the planted hills. In my present application, I increase the size and number of spokes upon the marking spur wheel and mount beside this wheel an auxiliary driving spur wheel having its spokes aligning between the spokes of the marking spur wheel. In my new arrangement I have also reduced the cost of manufacture and simplified the construction of the planter by eliminating all clutches and the operating means therefor and have further dispensed with one set of sprocket wheels and their drive chains and yet maintain lateral adjustment of the frame for different widths of row planting. In my present application I have also provided gauge bar means adapted to be associated with the marking spur wheel in such manner as to insure proper positioning of one of the marking spurs when starting a row.

Other objects and advantages of the invention will be apparent during the course of the following detailed description, taken in connection with the accompanying drawings forming a part of this specification and in which drawings:

Figure 3 is a transverse section thru the machine taken on a line at the rear of the ground engaging wheels and looking forwardly.

Figure 4 is an enlarged fragmentary detail view part in section and part in elevation of one of the seed dropping devices.

Figure 5 is a detail horizontal section thru the lower portion of one of the seed hoppers.

Figure 6 is a fragmentary plan view showing the manner in which the planter may be adjusted laterally for planting wider rows.

Figure 7 is a perspective view of the auxiliary driving spur wheel.

Figure 8 is a perspective view of the combined marker and driving spur wheel.

Figure 9 is a view part in section and part in elevation of the shaft coupling for the feed shaft of the seed droppers.

Figure 10 is a perspective view of the coupling sleeve for the feed shaft.

Figure 11 is a perspective view of the mounting for the indicator arms.

Figure 1:
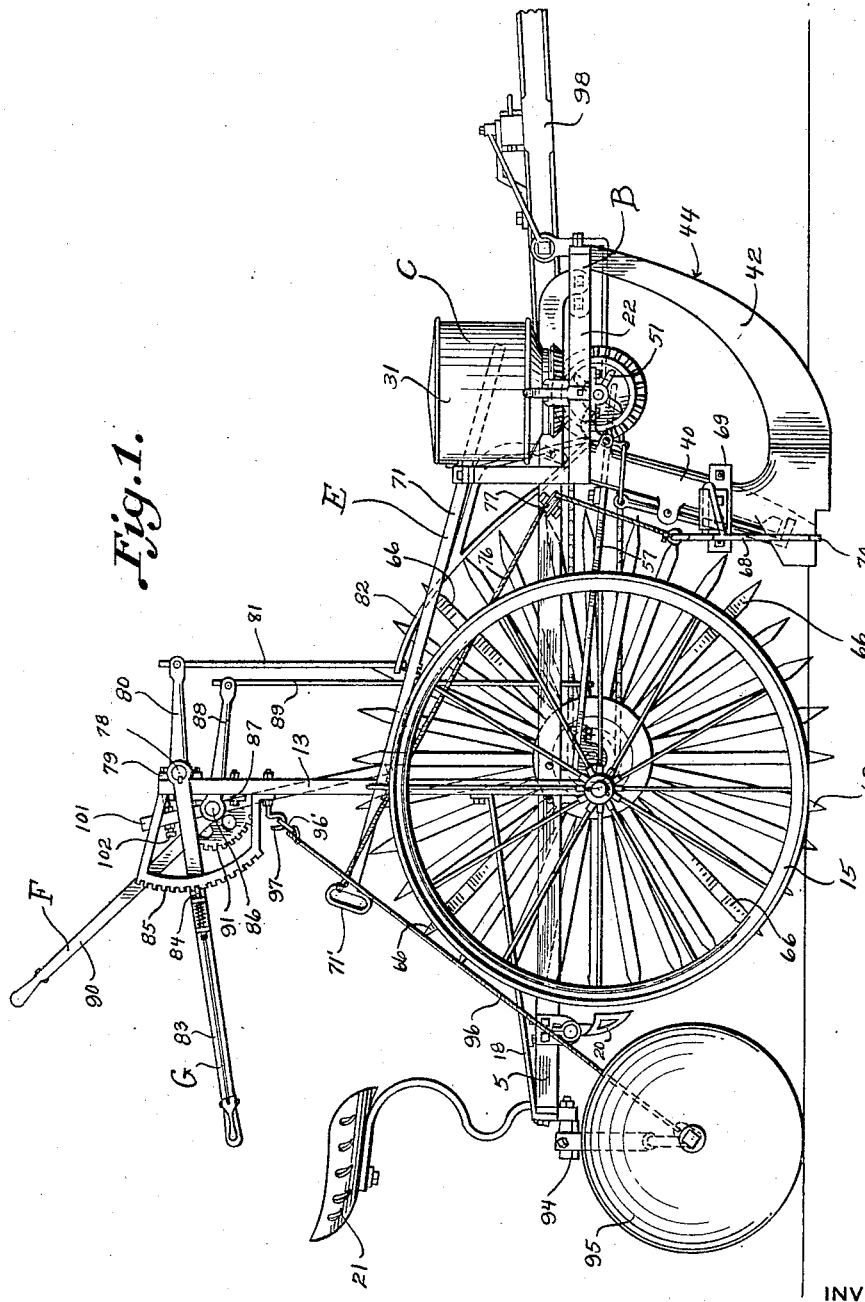
Figure 1 is a side elevation of the improved planter, shown in a starting position.
Figure 2:
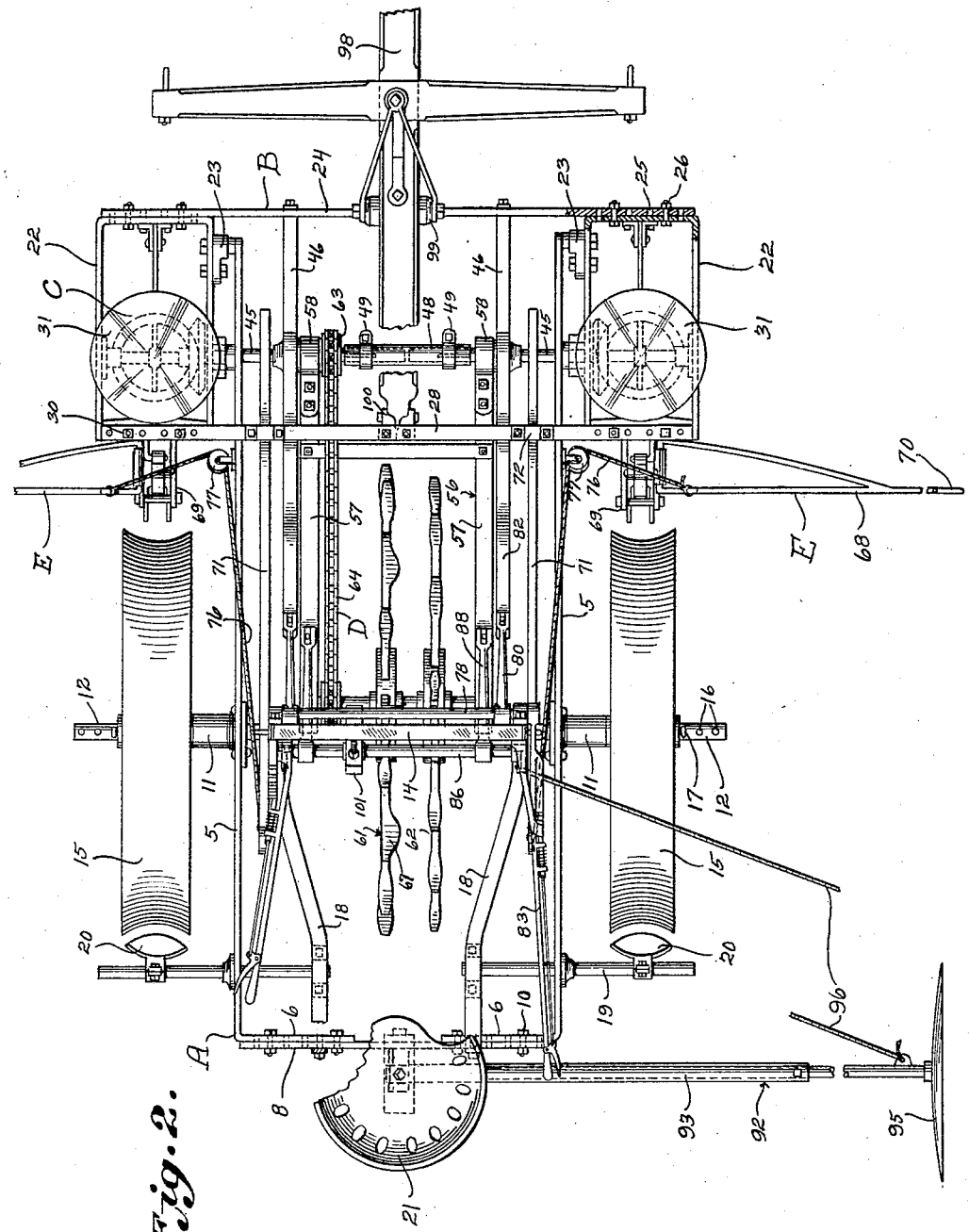
Figure 2 is a top plan view of the planter.

In the drawings, and wherein similar reference characters designate corresponding parts thruout the several views, the letter A may designate a main supporting frame, B a cross frame pivotally mounted at the forward end of the frame A and supporting seed dropping mechanism C, D combined marking and drive means, E checking means for checking row spacing and aligning of the hills transversely of the rows, F elevating means for the means D, and G elevating means for the cross frame B.

The main supporting frame A embodies a pair of parallel side rails or members 5 each having an inturned portion 6 at its rear end provided with a series of evenly spaced apart apertures 7 as shown in Figure 6. These side rails 5 are laterally adjustable and are connected at their rear ends by a rear cross rail 8 provided adjacent each end with a series of apertures 9 adapted to align with the apertures 6 and receive suitable bolts 10. Mounted in suitable bearings 11 secured in axial alignment one upon each of the side rails 5 at a point substantially midway the ends of the rails are the stub axles 12 of an inverted U-shaped frame portion embodying vertical side arms 13 connected at their upper ends by a horizontal head piece 14. The axles 12 extend from the lower ends of the side arms 13 and each carries a covering wheel 15. Each axle 12 is provided with a series of transverse openings 16 for removably receiving a suitable pin or key 17 whereby the wheels may be adjusted laterally toward and away from the side arms 13, for varying the spacing between the wheels. The openings 16 are spaced apart a distance equal to the spacing of the openings 7 and 9 provided in the frame members 6 and 8 respectively. Connected between each upstanding side arm 13 at the rear cross rail 8 is a brace member 18, and each brace member supports the inner end of a scraper shaft 19. These scraper shafts 19 are rigidly attached to the braces 18 and slidably extend thru the side rails 5 behind the covering wheels 15 for supporting scrapers 20 which may be adjusted longitudinally along the shaft for proper aligning with the covering wheel when adjusted along the axles 12. A suitable seat 21 may be mounted upon the cross rail 8.

The cross frame B for pivotal mounting upon the forward end of the main frame A embodies a pair of open planter supporting frames 22 one of which is disposed outwardly of each side rail 5 forwardly of the covering wheels 15. At the inner side and adjacent the forward end of each open frame 22 are suitable bearings 23 for pivotal connection with the forward ends of the rails 5 whereby the cross frame B may be rocked upwardly along its rear edge. Connecting the forward ends of the frames 22 is a tie bar 24 provided adjacent each end with a series of apertures 25 adapted to receive bolts 26 extended thru the forward portions of the frames 22. The frames 22 at their rear ends have upstanding portions 27 which are connected by a rear tie bar 28 which extends across the forward portion of the frame A in spaced relation above the side rails 5. This rear tie bar 28 is also provided adjacent each end with a series of apertures 29 adapted to removably receive bolts 30. Thus it will be seen that the supporting frames 22 may be adjusted toward and away from one another and that the side rails 5 are adjustably movable with the frames 22.

Referring now to the seed planting mechanism C, the same includes a pair of seed boxes or hoppers 31 mounted one in each of the planter supporting frames 22. Each seed box or hopper 31 has its bottom formed with an annular opening 32 beneath which is rotatably mounted a seed or drop plate 33 provided with a series of annularly arranged openings 34 of elongated formation as shown in Figure 5. The disc or seed plate 33 is mounted in a recessed bevel gear rim 35, said gear rim of each individual planter structure meshing with a bevel drive gear 36. Mounted below the seed plate 33 of each hopper is a plate 37 having an escape opening 38 for the seed opening into a chute 39.

Extending downwardly from the forward end of each frame 22 is a hollow shank or seed tube 40 having discharge openings 41 at their lower ends and at their upper ends communicating with the chute 39 whereby the seed from the hoppers 31 are directed downwardly thru the seed tube. Connected between the lower end of each seed tube 40 and the forward portion of the frames 22 is a curved runner or furrow opener 42.

Mounted in the cross frame B to extend transversely of the main frame A, is a feed shaft 43 for operation of the planters designated generally by the numerals 44. This feed shaft 43 embodies a pair of end sections 45 suitably journaled one in each of the planter supporting frames 22. Fixedly mounted upon the outer end of each shaft section 45 is a bevel drive gear 36 for rotating the seed plates 33. The shaft section 45 may also be journaled in cross members 46 of the frame B. The inner end of each shaft section 45 is provided with a longitudinally formed key-way or slot 47, and the inner ends of the shaft sections are coupled in axial alignment by means of a longitudinally divided coupling sleeve 48 the sections of which are adapted to be clamped about the shaft sections by means of suitable clamps 49. One section of the split coupling sleeve 48 is provided adjacent each end with inwardly projecting keys 50 for fitting in the keyways 47 whereby the shaft sections 45 will be coupled for rotation with one another. This method of coupling the shaft sections 45 will permit adjustment of the planters 44 toward and away from one another when varying the spacing between the rows to be planted.

Affixed to each shaft section 45 is a four pronged spur wheel 51 which are in alignment longitudinally of the machine with the seed tubes 40. Closing the opening 41 of each seed tube is a valve 52 pivoted upon the seed tubes as at 53 and connected by a link 54 to a pivoted pawl 55 to be engaged by the prongs of the spur wheels 51 whereby the valves 52 will be opened and closed four times upon each rotation of the feed shaft 43. The spur wheels 51 are adjustable on their shaft sections so that the valve 52 of each planter may be timed to open and close in unison.

Referring now to the means D serving as a drive means for operating the planters 44 and also as a marker for the spacing between the hills along the rows, the same embodies a carrier frame pivotally hung between the rails 5 upon the fed shaft 43. This carrier frame 56 embodies a pair of side arms 57 pivotally mounted at their forward ends by suitable bearings 58 one upon each of the shaft sections 45 at opposite ends of the coupling sleeve 48. Rotatably mounted in suitable bearings 59 at the rear free ends of the arms 57 is a shaft 60 having mounted thereon a combined marking and driving spur wheel 61 and an auxiliary driving spur wheel 62. These spur wheels 61 and 62 carried by the rear free end of the frame 56 are rotatable on an axis substantially in alignment with the axis of the stub axles 12. Mounted upon one of the shaft sections 45 between one end of the sleeve 48 and one of the bearings 58 is a sprocket wheel 63 over which a drive chain 64 is trained and extends about a sprocket 65 mounted upon the shaft 60. These sprocket wheels 63 and 65 are of a like size so that upon one complete revolution of the shaft 60, the feed shaft 43 will be rotated for one complete revolution. The wheels 61 and 62 are mounted on the shaft 60 in slightly spaced apart relation at a position near the longitudinal center of the frame A and these wheels may be provided with any desired number of spurs for insuring positive rotation of the shaft 60 during travel of the corn planter. In the example shown each wheel is provided with sixteen spurs and the wheels are mounted upon the shaft 60 so that the spurs of one wheel are spaced midway between the spurs of the companion wheel as clearly shown in Figure 1. The wheel 61 is provided with four equally spaced apart marking spurs 66 which are adapted to make marks in the ground which can be readily distinguished from the marks made by the remaining spurs of either wheel. The marking spurs 66 have flat blade-like portions 67 which are offset to one side of the wheel as shown in Figure 3 whereby the ends 67 of the marking spurs are substantially at the longitudinal center of the corn planter. The combined marking and driving spur wheel 61 is so adjusted upon the shaft 60 that each time one of the marking spurs 66 is in a ground penetrating position for making a guiding ground mark, the spur wheels 51 will be in a position releasing their valves 52 for dropping seed from the tubes 40.

The checking means E for aligning the hills transversely of the rows, and one of which is mounted at each side of the machine, each embodies an indicating arm 68 pivotally mounted in a clamp 69 connected about the lower ends of the seed tubes 40. The indicating arms 68 are in alignment transversely of the machine with the outlet openings 41 of the seed tubes and each arm is preferably provided at its outer downturned end with a gauge foot 70. These arms 68 are of a length equal to one and one-half times the distance between the seed tubes 40. Each arm 68 is provided with an independent elevating means whereby either of the arms may be raised or lowered, and these elevating means each embodies a slide rod 71 the forward ends of which have free sliding movement in guides 72 mounted upon the tie bar 28. The rear end portions of the rods 71 extend thru U-shaped guides 73 mounted upon the outer sides of the upstanding side arms 13 of the inverted U-shaped portion of the frame A. The under side of each rod 71 is provided with a toothed or rack portion 74 adapted to engage with the lower portion of the guides 73 for retaining the rods in longitudinally adjusted positions. Each indicating arm 68 is provided with an extension 75 to which is connected one end of a cable 76 which are trained thru sheaves 77 mounted upon the side rails 5 and have their opposite ends connected to the handles 71' of the slide rods 71. Thus it will be seen that upon longitudinal movement of the slide rods thru gripping the handles 78 that the indicating arms 68 may be raised or lowered. The rods 71 each have a loose sliding fit in their guides 72 and 73 to permit upward tilting of the cross frame B by the elevating means G.

The elevating means G for raising and lowering the cross frame B embodies a rock shaft 78 journaled at its ends in suitable bearings 79 secured to the upper ends and at the front sides of the arms 13. Secured to the shaft 78 is a pair of forwardly extending rocker arms 80 each of which has connected to its forward end a depending link 81 which are connected at their lower ends to brackets 82 secured to and projecting rearwardly from the cross frame B at opposite sides of the spur wheels 61 and 62. Secured to one end of the rock shaft 78 is a rearwardly extending operating lever 83 having a spring pressed pawl 84 for engagement in a toothed sector 85 mounted upon one of the arms 13. The operating lever 83 projects rearwardly to a position adjacent one side of the driver's seat 21 and it will be seen that upon vertical swinging of the lever 83 that the rocker arms 80 will rock the cross frame B in a vertical direction about the pivots 23. This rocking of the cross frame B raises and lowers the lower end of the runners 42 out of engagement with the ground.

The elevating means F for raising and lowering the carrier frame 56 for raising and lowering the spur wheels 61 and 62 out of engagement with the ground, embodies a rock shaft 86 mounted at its ends in suitable bearings 87 secured to the upper ends and at the rear sides of the frame arms 13. Secured to and projecting forwardly from the shaft 86 between the arms 13 is a pair of rocker arms 88 each of which at its forward end is connected with a link 89 the lower ends of which are connected one to each of the arms 57 adjacent the rear ends of the arms. Secured to one end of the shaft 86 is an operating lever 90 provided with a spring pressed pawl for engagement with a toothed sector 91 whereby the rocker arms 88 may be held in an adjusted position. The operating lever 90 is mounted at the opposite side of the inverted U-shaped portion of the main frame A to that of the operating lever 83 and projects rearwardly to a point adjacent the driver's seat 21. Vertical swinging movement of the lever 90 will cause the rear portion of the carrier frame 56 to be raised and lowered about the pivotal connection of the frame upon the shaft sections 45. This raising and lowering of the frame 56 will engage and disengage the spurs of the wheels 61 and 62 with the ground.

A disc row marker 92 is mounted at the rear end of the frame A for use in the ordinary manner of row markers and embodies an extensible shaft 93 connected by the usual universal joint 94 to the rear cross rail 8 whereby the disc 95 may be disposed at either side of the planter. A suitable cable 96 is connected at one end with the outer end of the shaft 93 and carries at its opposite end a suitable ring 96' adapted to be connected with hooks 97 carried one by each of the side arms 13. This arrangement will permit the driver to easily change the disc 95 to either side of the planter.

The tongue 98 has a pivotal connection as at 99 with the tie bar 24 and has its rear end adjustably connected with the tie bar 28 as at 100.

Pivotally mounted for free sliding movement along the rock shaft 86 is a gauge bar 101 the lower end of which may be moved into the path of rotation of the spur wheel 61 thru sliding movement of the gauge longitudinally along the shaft 86. The upper end of the gauge bar 101 projects above and to the rear of the head piece 14 and carries an adjustable set screw 102 adapted to engage the head piece 14 for limiting rearward swinging movement of the lower end of the bar 101. This gauge bar 101 is brought into use when starting a new row and serves to properly position and prevent rotation of the spur wheel 61 when a new row is being started.

It is thought to be readily apparent from the drawings the manner in which the planter may be adjusted for planting rows of different widths. In adjusting the planter for varying the spacing between the planters 44, the coupling sleeve clamps 49 are also loosened to permit the shaft sections 45 to move axially toward and away from one another with the planter supporting frames 22. After the machine has been adjusted to the proper width the clamps 49 may again be tightened so that a continuous feed shaft is formed and rotated by the single sprocket wheel 63.

In operation of the improved planter, the lever 90 is operated for lowering the frame B whereby the planters 44 will be lowered into proper ground engaging relation and the lever 83 is operated for lowering the spur wheels 61 and 62 into engagement with the ground. The indicating arms 68 are raised out of engagement with the ground and the disc row marker 92 is positioned at the proper side of the machine for cutting a marking line during travel of the machine. Forward movement of the machine causes rotation of the spur wheels 61 and 62, which thru the chain 64 and sprockets 63 and 65 causes rotation of the feed shaft 43 at a like speed of rotation as that of the shaft 60. Rotation of the shaft 43 operates the planters 44 so that seeds are periodically dropped from the seed outlet 41 by the rotating four pronged spur wheels 51. The valves 52 are so timed as to open the outlet 41 and discharge the seed each time one of the marking spurs 66 makes an impression in the ground. When the machine has traveled to the end of the row, the levers 83 and 90 are operated for raising the planters 44 out of engagement with the ground and also the spur wheels 61 and 62. This raising of the spur wheels 61 and 62 prevents operation of the planting mechanism.

The machine is then turned about to start the new rows to be planted and with the proper indicating arm 68 lowered so that its foot 70 is held slightly spaced above the ground, the machine is brought into a position with the foot 70 in alignment with the row of markings made by the combined marking and driving spur wheel 61. The planters 44 are now lowered and the machine moved forwardly until the outer end of the indicating arm 68 is directly above one of the ground marks made by one of the marking spurs 66. With the indicating arm in such a position, the seed outlet 41 will be in direct alignment with the previously planted seeds in a direction transversely of the rows. With the machine now in a proper starting position, the operator manually rotates the spur wheels in a forward direction until the valves 52 have been opened and the seed dropped from the tubes 40. After the seed have been dropped, the operator then moves the gauge bar 101 along the shaft 86 into a position as shown in Figure 3 and sets the bar between the second and the third plain spur counting rearwardly from one of the marking spurs 66. With the gauge bar in this position the operator merely places his foot upon any one of the spurs of either wheel 61 to 62 and rotates the spur wheels in a rearward direction until the second plain spur back of the marking spur engages and is stopped by the lower end of the gauge bar. After the seed have been dropped thru manual rotation of the spur wheels, and the spur wheels properly positioned by the gauge bar, the lever 90 is operated for lowering the spur wheels and at the same time the operator steps upon any one of the spurs for forcing the spurs well into the ground. As the spurs are being forced into the ground the gage bar 101 acts to prevent rearward rotation of the spur wheels and therefore one of the marking spurs 66 is disposed in a position to enter the ground on a line between the manually dropped hills. The gauge bar 101 may then be slid out of engagement with the spur wheel 61 and after raising the indicator arm 68 the planter is moved forward for planting the next two rows, the rows being properly spaced from the previously planted rows thru the row marking made by the disc 95.

Thus it will be seen that the planting will be checked both ways so that the distance between hills along the rows will be the same as the distance between the rows and permits cultivation of the field in both directions. It will be noted that the special mounting of the gauge bar 101 permits forward rotation of the spur wheels 61 and 62 without danger of breaking either the gauge bar or the spurs of the wheels should the gauge bar not be moved laterally when starting the machine.

From the foregoing description it will be apparent that an improved construction for corn planters has been disclosed embodying a novel arrangement whereby the width between the rows may be readily varied, and also the novel arrangement whereby the feed shaft for the independent planters is extensible permitting ready and easy adjustment of the planters toward and away from one another. It will also be apparent that a novel marking arrangement has been disclosed whereby the planting may be accomplished so that the seed is planted in rows aligning transversely of the planting rows without requiring the use of a check wire or the like. It will further be apparent that a novel arrangement has been shown whereby clutches will not be required for the planters and that the driving means for operating the planters also acts as a marking device for properly aligning the hills transversely of the planted rows.

Changes in detail may be made to the form of invention herein shown and described, without departing from the spirit of the invention or the scope of the following claims.

I claim:

1. In a corn planter the combination of a main supporting frame, ground wheels supporting the frame, a cross frame supported at the forward end of the main frame, a planter mounted in each end of the cross frame in alignment forwardly of the ground wheels, an indicating arm for each planter, a carrier frame pivotally mounted at its forward end upon the cross frame and extending rearwardly between the ground wheels, a drive shaft rotatably mounted in the rear end of the carrier frame, a marking spur wheel fixed on the drive shaft and provided with evenly spaced apart marking spurs and disposed at the longitudinal center of the planter, an auxiliary spur wheel fixed on the shaft in spaced relation to the marking spur wheel and having the spurs thereof offset with respect to the spurs of the marking spur wheel, and drive means for operating the planters from the drive shaft.

2. In a corn planter the combination of a main supporting frame, covering wheels supporting the frame, a cross frame mounted upon the forward end of the main frame, a planter mounted in each end of the cross frame forwardly of the covering wheels and each embodying a valve controlled seed tube, an indicating arm mounted upon each planter in alignment with the seed outlet openings thereof, a ground engaging spur wheel embodying evenly spaced apart marking spurs and plain spurs between the marking spurs, a drive coupling between the spur wheel and planters for operating the valves of the seed tubes each time one of the marking spurs engages the ground, and gauge means movable into engagement with one of the plain spurs for holding the spur wheel in a position with one of the marking spurs in proper marking position.

3. In a corn planter the combination of a main supporting frame covering wheels supporting the frame, a cross frame supported upon the forward end of the main frame, a planter mounted in each end of the cross frame, a feed shaft for operating the planters, an indicating arm for each planter, a carrier frame pivotally mounted at its forward end upon the feed shaft and extending rearwardly between the covering wheels, a drive shaft rotatable in the rear end of the carrier frame, a ground engaging spur wheel fixed to the drive shaft and provided with evenly spaced apart marking spurs, elevating means for the carrier frame embodying a rock shaft supported on the main frame above the spur wheel, a drive coupling between the drive shaft and feed shaft for operation of the planters, and a gauge bar slidable along the rock shaft and engageable with a spur of the spur wheel for proper positioning of one of the marking spurs for checking the rows transversely of the planted rows.

4. In a corn planter the combination of a main supporting frame including an inverted U-shaped portion embodying side arms and a head piece connecting the upper ends of the side arms, covering wheels supporting the frame, a planter mounted forwardly of each covering wheel, a carrier frame pivotally mounted in the cross frame and extending rearwardly between the covering wheels, a ground engaging spur wheel mounted in the rear portion of the carrier frame and embodying evenly spaced apart marking spurs, drive means between the spur wheel and planters for operation of the planters, elevating means for the carrier frame embodying a rock shaft extended between the upper ends of said side arms below the head piece, a gauge rod pivotally and slidably mounted on the rock shaft to extend above and below the shaft, said gauge rod at its lower end adapted to be movable into engagement behind a spur of the spur wheel to prevent rearward rotation of the spur wheel, an adjustment screw at the upper end of the gauge bar for engagement with said head piece, and an indicating arm carried by each planter.

RALPH ORLIN NEWELL.